United States Patent [19]

Stone

[11] Patent Number: 4,805,706

[45] Date of Patent: Feb. 21, 1989

[54] ROTARY IMPACT APPARATUS

[76] Inventor: Alan M. Stone, 168 Mountain View Rd., Greensborough, Victoria 3088, Australia

[21] Appl. No.: 84,687

[22] Filed: Aug. 12, 1987

[30] Foreign Application Priority Data

Aug. 12, 1986 [AU] Australia .............................. PH07393

[51] Int. Cl.⁴ .............................................. B25D 15/00
[52] U.S. Cl. ...................................... 173/93.5; 464/44
[58] Field of Search ...................... 173/12, 93.5, 93.6; 192/56 R; 464/40–42, 44

[56] References Cited

U.S. PATENT DOCUMENTS

| | | | |
|---|---|---|---|
| 1,835,168 | 12/1931 | McKean | 464/42 |
| 2,261,204 | 11/1941 | Amtsberg | 173/96.5 |
| 2,527,517 | 10/1950 | Barker et al. | 464/44 |
| 2,886,997 | 5/1959 | Madsen | 173/93.5 |
| 4,429,775 | 2/1984 | Teramoto | 173/12 X |
| 4,537,264 | 8/1985 | Schmid et al. | 173/48 |

Primary Examiner—Frank T. Yost
Assistant Examiner—James L. Wolfe
Attorney, Agent, or Firm—Harness, Dickey & Pierce

[57] ABSTRACT

A rotary impact apparatus comprises an input shaft capable of attachment to an electric drill and arranged to drive an impact assembly through a cone clutch and an output shaft capable of being driven by the impact assembly. The clutch is adjustable by means of a nut and a spring to vary the torque at which drive to the output shaft is disengaged. The impact assembly comprises two rockers adopted to drive the output shaft in respective directions. Each rocker is biased out of engagement with the output shaft by a rocker spring but is unbalanced and rotation of the impact assembly through the clutch by the input shaft creates a centrifugal force on it against the rocker spring whereby it engages the output shaft to rotate the output shaft until resistance to rotation is such that the clutch disengages and rotation of the impact assembly stops. The rocker spring then biases the rocker out of engagement with the output shaft, thereby allowing the clutch and impact assembly free rotation until the sequence is repeated.

13 Claims, 2 Drawing Sheets

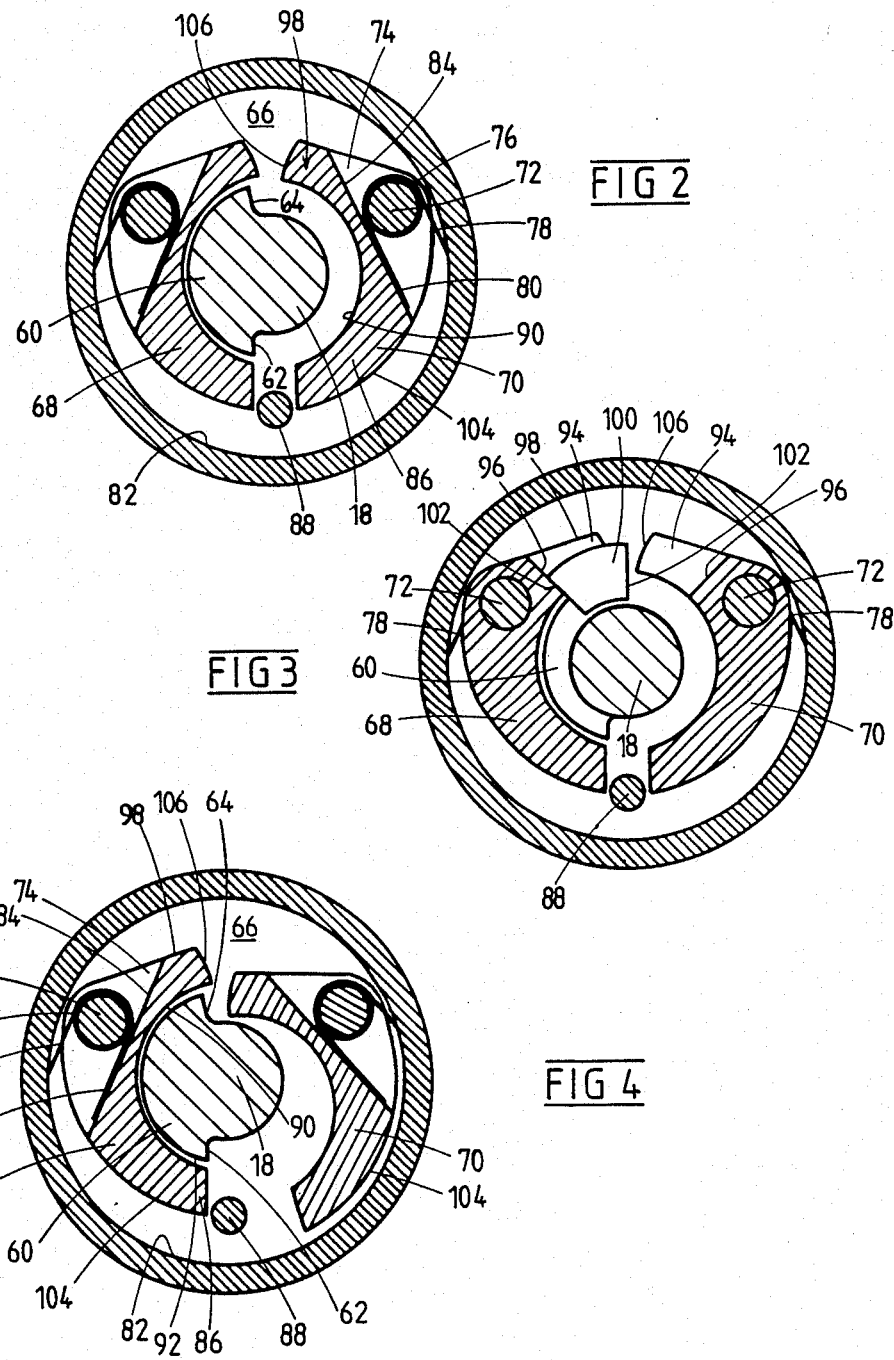

ROTARY IMPACT APPARATUS

This invention relates to rotary impact apparatus and is particularly concerned with a torque device usable for example for mechanically tightening and loosening bolts and screws.

Torque wrenches are well known and pneumatic rotary impact wrenches have been proposed for applying torque to, for example, bolts and screws. These pneumatic wrenches require a supply of compressed air for their operation which is both relatively expensive and not normally as readily available as an electric power supply. In one proposal, the pneumatic wrenches comprise a rotary air motor which drives an integral impact mechanism. This impact mechanism imparts considerable impact forces to the air motor during operation. These shock forces tend to be so severe that a conventional electric drill would not be suitable for direct connection to such an impact mechanism.

It is an object of the present invention to provide a rotary torque device which is suitable for use with any form of rotational drive or is directly associated with any form of rotary drive, including an electric motor.

According to the present invention there is provided a rotary torque device comprising rotatable input means, an impact assembly rotatively driven by the input means and output means drivable by the impact assembly, the impact assembly comprising a rocker normally biased out of engagement with the output means but displaceable into engagement with the output means by a force greater than the biasing force and acing on the rocker at a preselected rotational speed of the impact assembly, and wherein a clutch assembly is provided between the input means and the impact assembly, said clutch assembly being adapted to permit substantially instantaneous relative rotation between the input means and the impact assembly above a preselected torque applied to the output means whereupon rotational drive to the impact assembly and output means is reduced so as to permit disengagement of the rocker from the output shaft under the action of the biasing force.

By the present invention, the clutch assembly disengages the impact assembly from the input drive above the preselected torque so that minimal shock forces are applied to the drive. When the rotational speed of the impact assembly drops below the aforementioned preselected speed, the biasing force acts on the rocker so as to disengage the rocker from the output means whereby the impact assembly can again rotate with the input means through the clutch assembly. When the speed of rotation of the impact assembly again builds up to the preselected rotational speed, the rocker is once again thrown into engagement with the output means so as to repeat the process.

Preferably the preselected torque is variable, and this may be provided for by adjustability of the contact force applied to the opposed faces of the clutch assembly. Advantageously, the clutch assembly is a cone clutch, preferably with adjustable torque facilities. Where the clutch slip torque between the input means and the impact assembly is adjustable, this is conveniently achieved by adjustment of a force applied to the opposed clutch faces by a spring or other biasing means.

Even though the rotary torque device of the invention is primarily directed towards use as an attachment to a conventional electric drill, in which case the input means may comprise an input shaft securable to the chuck of the drill, it is also suitable for attachment to a number of other rotary power sources and could be incorporated in an integral impact wrench in which case the rotatable input means may comprise the motor. It will be appreciated that the variable torque output of the device can be controlled by, for example in the case of an electric motor drive, control of the current input to the electric motor, for either torque or speed control, or by control of the clutch slip torque between the input means and the impact assembly as described above.

Usually it will be desirable for the rotary torque device to be rotatable in both clockwise and anti-clockwise directions so as to, for example, tighten and loosen bolts and screws. For this purpose, it may be necessary for the impact assembly to be capable of providing impact drive in both senses of direction of rotation, and in a preferred embodiment, the first mentioned rocker is displaceable into engagement with the output means at a preselected rotational speed in one direction of rotation and the impact assembly comprises a second rocker normally biased out of engagement with the output means but displaceable into engagement with the output means by a force greater than the biasing force and acting on the second rocker at a preselected rotational speed in the opposite direction of rotation of the impact assembly. Advantageously, the first and second rockers are diametrically opposed about the axis of rotation of the impact assembly so as to assist in dynamic balancing of the impact assembly.

Preferably, the or each rocker is unbalanced in the sense that it has a greater mass to one side of a pivot point than to the other side whereby rotation of the impact assembly may cause a centrifugal force to act on the rocker and displace it into engagement with the output means. Alternatively, the or each rocker could be caused to be thrown into engagement with the output means by being disposed in its spring-biased condition with one end closer to the centre of rotation than the other end so as to be thrown above the preselected speed of rotation of the impact assembly.

One embodiment of a rotary torque device in accordance with the present invention will now be described with reference to the accompanying drawings in which:

FIG. 2 is a sectional view taken along line 2—2 of FIG. 1;

FIG. 3 is a sectional view taken along line 3—3 of FIG. 1; and

FIG. 4 is a sectional view similar to FIG. 2 except showing a rocker in its impact condition.

Figure 1:
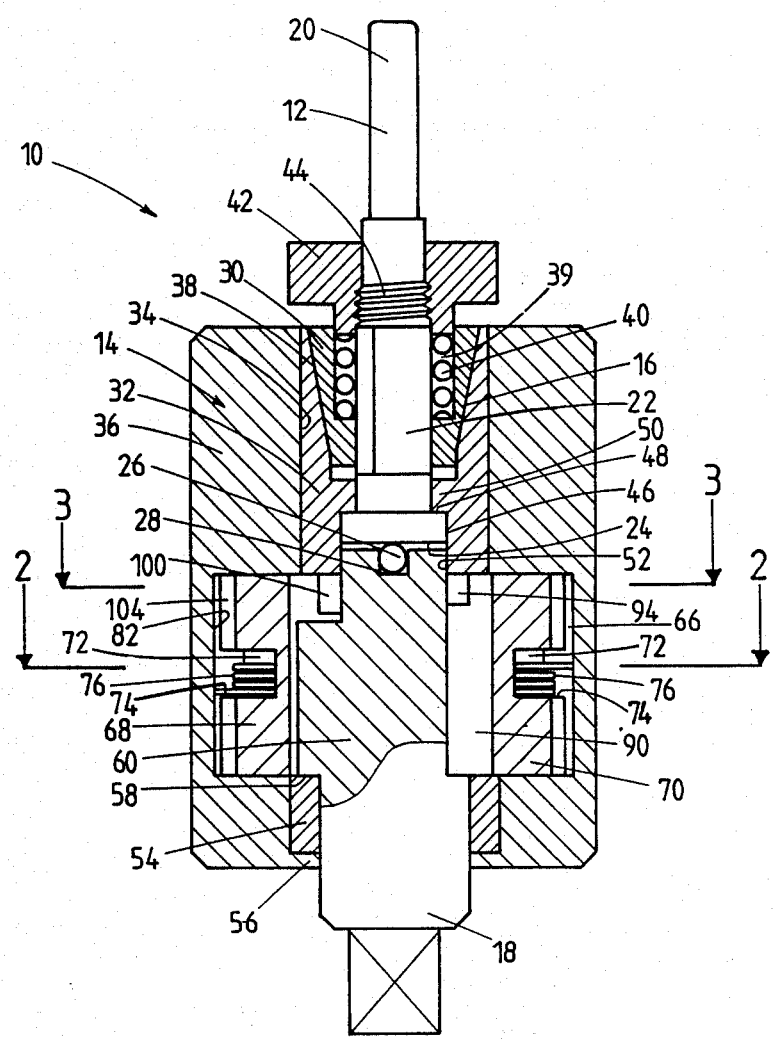
FIG. 1 is a sectional view along an axial plane of the device.

The rotary torque device 10 comprises an input shaft 12 arranged to drive an impact assembly 14 through a clutch 16 and an output shaft 18 capable of being driven by the impact assembly 14.

The input shaft 12 comprises a spigot 20 capable of being locked in a chuck of an electric drill (not shown) or other rotary drive apparatus and a drive shaft 22 extending from the spigot 20 co-axially therewith. The drive shaft 22 has an end face 24 which engages a thrust bearing 26 shown diagrammatically as a ball bearing which is seated in a recess 28 in the inner end of the output shaft 18.

The clutch 16 comprises an annular driving member 30 mounted co-axially with the drive shaft 22 for rotation therewith but in a manner which permits relative axial displacement, and a coaxial annular driven member 32 having a cylindrical outer face which is received in a coaxial passage 34 in a body 36 of the impact assembly 14. The clutch driven member 32 is secured for rotation with the impact assembly 14 and the driving and driven members 30 and 32 of the clutch have conical opposed clutch faces 38.

An annular recess 39 in the driving member 30 of the clutch receives a coil spring 40 coaxially around the drive shaft 22, and a threaded nut 42 received on a screw threaded portion 44 of the input shaft 12 intermediate the spigot 20 and drive shaft 22 engages the axially outer end of the spring 40. Accordingly, the clutch slip torque between the clutch faces 38 is adjustable by rotating the nut 42 relative to the input shaft 12 to thereby compress or expand the coil spring 40. The axially inner end of the nut 42 is received as a close fit in the annular recess 39 so as to provide additional radial location of the impact assembly 14 relative to input shaft 12.

The end face 24 of the drive shaft 22 is formed on a radially enlarged end portion 46 which defines a shoulder 48 which engages an annular flange 50 of the driven member 32 of the clutch to prevent axially outwards displacement of the input shaft 12 relative to the driven member 32. The flange 50 also defines a bearing face for the drive shaft 22.

The driven member 32 of the clutch also provides a bearing face 52 for the axially inner end of the output shaft 18, and a bearing shown schematically at 54 is provided for the axially outer end of the output shaft. The bearing 54 is seated on an annular flange 56 of the body 36 and axially outwards displacement of the output shaft 18 is prevented by engagement of an axially outer end surface 58 of a cam 60 of the shaft engaging the bearing 54. As shown in FIGS. 2 and 4, the cam 60 of the output shaft 18 extends through approximately 150° and has opposed radial end faces 62 and 64 the purpose of which will be described hereinafter.

The body 36 of the impact assembly 14 is substantially cylindrical and the coaxial passage 34 opens into an enlarged coaxial cylindrical chamber 66 in which unbalanced rockers 68 and 70 are mounted for restricted pivotal movement about respective pins 72 which extend parallel to the axis of the device. Each rocker 68 and 70 has a recess 74 therein through which the respective pin 72 passes and in which a respective helical spring 76 is received. Each helical spring 76 is received about an associated one of the pins 72 and has opposed legs 78 and 80. The leg 78 of each helical spring bears against the radially inner wall 82 of the chamber 66 while the leg 80 bears against the opposed wall 84 of the recess 74 so as to bias a leg 86 of the rocker 68 or 70 into engagement with a common stop 88 as shown in FIG. 2.

Each of the rockers 68 and 70 has an arcuate radially inner surface 90 which in the biased condition of the rocker is concentric with and of slightly greater diameter than an arcuate radially outer surface 92 of the cam 60 of the output shaft 18. Accordingly, in the biased condition of both rockers 68 and 70, the impact assembly 14 with the rockers 68 and 70 is capable of rotating about the drive shaft 18.

The rockers 68 and 70 have respective rebates 94 in the axially inner end thereof which rebates are opposed to each other and which define respective drive faces 96. The rebates 94 are formed in legs 98 remote from the stop 88 which are of shorter length and lesser weight than the legs 86. Rotational drive is imparted to the impact assembly by a dog 100 which projects into the opposed rebates 94 from the driven member 32 of the clutch. The dog 100 has opposed faces 102 each of which is capable of engaging a respective one of the drive faces 96 according to whether the device 10 is to be rotated in a clockwise or an anti-clockwise direction. As shown in FIG. 3, the dog 100 is in abutment with the drive face 96 of rocker 68 to drive the device 10 in an anti-clockwise direction when viewed from above. This rotational movement would undo a screw or bolt of right hand thread. The dog 100 has a face (not shown) which projects below the rebates 94 (as can be seen from FIG. 1 where the bottom edge of the dog is below the level of the opposite rebate 94) and this face abuts the radially inner face 90 of the rocker 68 to prevent this rocker from pivoting about the associated pin 72 when rotational forces are applied to the impact assembly 14.

The other rocker 70 is however free to pivot and when a centrifugal force greater than the biasing force applied by the associated helical spring 76 acts on the rocker above a predetermined rotational speed of the impact assembly, the leg 86 will pivot outwardly while the leg 98 pivots inwardly about the pin 72, thereby compressing the helical spring 78 as shown in FIG. 4. The leg 86 of each of the rockers 68 and 70 has a radially outer surface 104 which essentially conforms to the cylindrical surface 82 of the chamber 66 when the leg 86 pivots outwardly. The leg 98 of each rocker 68 and 70 has a hammer face 106, and when the leg 98 pivots inwardly under the action of the moment about the pin caused by the centrifugal force acting on the unbalanced rocker, the hammer face 106 engages the opposing radial end face 62 or 64 of the cam 60 of output shaft 18 thereby imparting rotational drive to the output shaft 18. As shown in FIG. 4, the hammer face 106 of rocker 70 is about to impact with the radial end face 64 of cam 60.

When the rocker 68 or 70 is not in engagement with the respective radial face 62 or 64 of the cam 60, the output shaft 18 will normally be stationary, being connected to the nut, bolt or screw to be tightened or loosened. The impact through the hammer face 106 of the rocker 70 on the radial face 64 as described above tends to instantaneously stop the rotating impact assembly 14 while imposing an equal and opposite impact onto the output shaft 18. Non rotation of the impact assembly relative to the input shaft 12 is permitted by the clutch 16 in which the clutch faces 38 will rotate relative to each other. At the time the impact assembly 14 stops rotating, the centrifugal force on the rocker 70 ceases and the helical spring 76 returns the rocker 70 to its position against the stop 88, thereby moving the hammer face 106 of the rocker 70 out of alignment with the radial face 64 so as to effectively disengage the cam 60. The clutch 16 is automatically re-engaged when resistance to rotation of the impact assembly 14 is removed so that the impact assembly is again accelerated to the rotational speed of the input shaft 12 by the clutch. The operating sequence of the device 10 is then repeated.

The impact assembly 14 is preferably accelerated to a rotational speed at which the rocker 68 or 70 is thrown into alignment with the respective radial face 62 or 64 in one rotation of the impact assembly. The torque output of the device 10 is determined by the torque setting of the driving member 30 of the clutch, provided the input drive motor speed remains at or above the rotational speed of the impact assembly 14. If the resistance to rotation of the output shaft 18 caused by the element being tightened or loosened is relatively small or negligible, the impact assembly 14 may continue to rotate with the output shaft 18 on engagement of the hammer face 106 with the cam 60 until the resistance to rotation is so great that the clutch 16 disengages. At this time, the impact assembly 14 will stop rotating and the respective rocker will be disengaged from the cam 60 as described above.

It will be appreciated that many modifications and variations may be made to the device described herein and all such modifications and variations should be considered as within the scope of the present invention. In particular, it will be appreciated that the output torque setting can be adjusted by the driving motor if the driving motor is speed adjustable or torque adjustable. Similarly, the device 10 may comprise an integral part of an electric drill or other rotational drive apparatus.

I claim:

1. A rotary torque device comprising a rotatable input means, an impact assembly rotatively driven by the input means and output means drivable by the impact assembly, the impact assembly comprising a rocker normally biased out of engagement with the output means but displaceable into engagement with the output means by a force greater than the biasing force and acting on the rocker at a preselected rotational speed of the impact assembly, and wherein an overload release clutch assembly is provided between the input means and the impact assembly, said overload clutch assembly being adapted to permit substantially instantaneous relative rotation between the input means and the impact assembly above a preselected torque applied to the output means whereupon rotational drive to the impact assembly and output means is reduced so as to permit disengagement of the rocker from the output shaft under the action of the biasing force.

2. A rotary torque device according to claim 1 wherein the preselected torque is variable.

3. A rotary torque device according to claim 2 wherein the preselected torque is varied by adjustment of the contact force applied to opposed faces of the clutch assembly.

4. A rotary torque device according to claim 3 wherein the clutch assembly comprises a cone clutch.

5. A rotary torque device according to claim 3 wherein the rocker is displaceable into engagement with the output means at a preselected rotational speed in one direction of rotation of the impact assembly and the impact assembly comprises a second rocker normally biased out of engagement with the output means but displaceable into engagement with the output means by a force greater than the biasing force and acting on the second rocker at a preselected rotational speed in the opposite direction of rotation of the impact assembly.

6. A rotary torque device according to claim 5 wherein the rocker is unbalanced in the sense that it has a greater mass to one side of a pivot point therefor than to the other side whereby rotation of the impact assembly may cause a centrifugal force to act on the rocker and displace it into engagement with the output means.

7. A rotary torque device according to claim 2 wherein the clutch assembly comprises a cone clutch.

8. A rotary torque device according to claim 1 wherein the clutch assembly comprises a cone clutch.

9. A rotary torque device according to claim 1 wherein the rocker is displaceable into engagement with the output means at a preselected rotational speed in one direction of rotation of the impact assembly and the impact assembly comprises a second rocker normally biased out of engagement with the output means but displaceable into engagement with the output means by a force greater than the biasing force and acting on the second rocker at a preselected rotational speed in the opposite direction of rotation of the impact assembly.

10. A rotary torque device according to claim 9 wherein the first-mentioned rocker and the second rocker are diametrically opposed about the axis of rotation of the impact assembly.

11. A rotary torque device according to claim 1 wherein the rocker is unbalanced in the sense that it has a greater mass to one side of a pivot point therefor than to the other side whereby rotation of the impact assembly may cause a centrifugal force to act on the rocker and displace it into engagement with the output means.

12. A rotary torque device according to claim 1 wherein the rotatable input means comprises an input shaft.

13. A rotary torque device according to claim 1 wherein the rotatable input means comprises a motor.

* * * * *